US008592549B1

(12) United States Patent
Grcev et al.

(10) Patent No.: US 8,592,549 B1
(45) Date of Patent: Nov. 26, 2013

(54) POLYAMIDE COMPOSITION, METHOD, AND ARTICLE

(71) Applicant: SABIC Innovative Plastics IP B.V., Bergen op Zoom (NL)

(72) Inventors: Snezana Grcev, Bergen op Zoom (NL); Johannes E. Fortuijn, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/705,309

(22) Filed: Dec. 5, 2012

(51) Int. Cl.
*C08G 64/00* (2006.01)
*C08G 63/02* (2006.01)

(52) U.S. Cl.
USPC ............ 528/328; 528/325; 528/337; 528/447

(58) Field of Classification Search
USPC .................................. 528/325, 328, 337, 347
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Carothers |
| 2,312,966 A | 3/1943 | Hanford |
| 2,512,606 A | 6/1950 | Bolton et al. |
| 4,565,684 A | 1/1986 | Tibbetts et al. |
| 4,572,813 A | 2/1986 | Arakawa |
| 4,663,230 A | 5/1987 | Tennent |
| 4,816,289 A | 3/1989 | Komatsu et al. |
| 4,876,078 A | 10/1989 | Arakawa et al. |
| 4,970,272 A | 11/1990 | Gallucci |
| 5,024,818 A | 6/1991 | Tibbetts et al. |
| 5,116,891 A | 5/1992 | Eberspach et al. |
| 5,132,365 A | 7/1992 | Gallucci |
| 5,165,909 A | 11/1992 | Tennent et al. |
| 5,357,022 A | 10/1994 | Banach et al. |
| 5,589,152 A | 12/1996 | Tennent et al. |
| 5,591,382 A | 1/1997 | Nahass et al. |
| 5,612,425 A | 3/1997 | Weber et al. |
| 6,593,411 B2 | 7/2003 | Koevoets et al. |
| 6,653,374 B1 | 11/2003 | Jang et al. |
| 7,226,963 B2 | 6/2007 | Koevoets et al. |
| 7,247,666 B2 | 7/2007 | Urabe et al. |
| 7,411,013 B2 | 8/2008 | Harashina et al. |
| 7,449,507 B2 | 11/2008 | Fishburn |
| 7,488,766 B2 | 2/2009 | Peters et al. |
| 7,534,822 B2 | 5/2009 | Elkovitch et al. |
| 7,592,382 B2 | 9/2009 | Borade et al. |
| 7,608,651 B2 | 10/2009 | Borade et al. |
| 7,847,032 B2 | 12/2010 | Guo et al. |
| 7,947,201 B2 | 5/2011 | Ting |
| 8,017,697 B2 | 9/2011 | Carrillo et al. |
| 8,017,716 B2 | 9/2011 | Carrillo et al. |
| 8,309,655 B2 | 11/2012 | Kamalakaran et al. |
| 2005/0228077 A1 | 10/2005 | Alger et al. |
| 2006/0167143 A1 | 7/2006 | Borade et al. |
| 2007/0167570 A1 | 7/2007 | Miyoshi |
| 2007/0194479 A1 | 8/2007 | Sato et al. |
| 2007/0244231 A1 | 10/2007 | Borade et al. |
| 2008/0167407 A1 | 7/2008 | Kishore et al. |
| 2008/0206468 A1 | 8/2008 | Klei et al. |
| 2008/0248278 A1 | 10/2008 | Fisher et al. |
| 2009/0242844 A1 | 10/2009 | Elkovitch |
| 2011/0152420 A1 | 6/2011 | Elkovitch et al. |
| 2011/0184128 A1 | 7/2011 | Guo et al. |

FOREIGN PATENT DOCUMENTS

| | | |
|---|---|---|
| EP | 1466946 A1 | 10/2004 |
| EP | 1950248 A1 | 7/2008 |
| WO | 0140353 A1 | 6/2001 |

OTHER PUBLICATIONS

Chan et al., "Facile Quantitative Analysis of Hydroxyl End Groups of Poly(2,6-dimethyl-1,4-phenylene oxide)s by 31P NMR Spectroscopy", Macromolecules, vol. 27, pp. 6371-6375 (1994), Abstract Only, 1 page.
JP2004155802 A, Jun. 3, 2004, Abstract Only, 2 pages.
JP2005154761 A, Jun. 16, 2005, Abstract Only, 1 page.
JP2009263460 A1, Nov. 12, 2009, Abstract Only, 1 page.
JP2009263461 A, Nov. 12, 2009, Abstract Only, 1 page.
JP2009263503 A, Nov. 12, 2009, Abstract Only, 1page.
JP2011148922 A, Aug. 4, 2011, Abstract Only, 1 page.
JP4214780 B2, Jan. 28, 2009, Abstract Only, 1 page.
International Search Report for International Application No. PCT/US2009/057988, Application Filing Date Sep. 23, 2009, Date of Mailing May 7, 2010, 8 pages.
Written Opinion for International Application No. PCT/US2009/057988, International Application Filing Date Sep. 23, 2009, Date of Mailing May 7, 2010, 4 pages.
International Search Report for International Application No. PCT/US2010/058146, Application Filing Date Nov. 29, 2010, Date of Mailing Aug. 16, 2011, 5 pages.
Written Opinion for International Application No. PCT/US2010/058146, International Application Filing Date Nov. 29, 2010, Date of Mailing Aug. 16, 2011, 4 pages.

*Primary Examiner* — Terressa Boykin
(74) *Attorney, Agent, or Firm* — Cantor Colburn LLP

(57) ABSTRACT

A method of forming a polyamide composition includes melt blending specific amounts of a poly(phenylene ether) masterbatch, a first polyamide, glass fibers, and a flame retardant that includes a metal dialkylphosphinate. The poly(phenylene ether) masterbatch is prepared by melt blending specific amounts of a poly(phenylene ether) and a second polyamide. The method provides a polyamide composition with a desirable balance of flame retardancy, melt flow, heat resistance, and mechanical properties, while reducing the amount of metal dialkylphosphinate required by corresponding compositions without the poly(phenylene ether) masterbatch. A corresponding polyamide composition is described, as are the poly(phenylene ether) masterbatch, and a method of reducing the metal dialkylphosphinate content of a flame retardant polyamide composition.

23 Claims, No Drawings

POLYAMIDE COMPOSITION, METHOD, AND ARTICLE

BACKGROUND OF THE INVENTION

Polyamides, also known as nylons, are widely used in variety of the electrical and electronic applications because of their good melt flow, chemical resistance, impact resistance, and electrical properties. For applications requiring a glass-filled polyamide composition with a high degree of flame retardancy, flame retardant additives must be added to the composition. Metal dialkylphosphinates are currently a preferred flame retardant for polyamides, but they are expensive and must be used in relatively high concentrations to confer high flame retardancy. There is therefore a need for glass-filled polyamide compositions that reduce the high concentrations of metal dialkylphosphinates while substantially maintaining flame retardancy, melt flow, heat resistance, and mechanical properties.

BRIEF SUMMARY OF EMBODIMENTS OF THE INVENTION

One embodiment is method of forming a polyamide composition, the method comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

Another embodiment is a method of forming a polyamide composition, the method comprising: melt blending components comprising, based on the weight of the polyamide composition, 5 to 14 weight percent of a poly(phenylene ether) masterbatch, 45 to 55 weight percent of a first polyamide comprising polyamide-6,6, 20 to 30 weight percent glass fibers, and 12 to 18 weight percent of a flame retardant comprising a metal dialkylphosphinate, melamine polyphosphate, and zinc borate to form the polyamide composition; wherein the poly(phenylene ether) masterbatch is the product of melt blending components comprising, based on the weight of the poly(phenylene ether) masterbatch, 75 to 96.5 weight percent poly(phenylene ether) comprising a homopolymer or copolymer of monomers selected from the group consisting of 2,6-dimethylphenol, 2,3,6-trimethylphenol, and combinations thereof, 3 to 24.5 weight percent of a second polyamide comprising polyamide-6,6, and 0.5 to 4 weight percent of a compatibilizing agent for the poly(phenylene ether) and the second polyamide; wherein the polyamide composition comprises less than or equal to 13 weight percent poly(phenylene ether), based on the total weight of the composition; and wherein the polyamide composition excludes electrically conductive fillers and impact modifiers.

Another embodiment is a polyamide composition prepared according to the above-described methods.

Another embodiment is a polyamide composition, comprising the product of melt blending: 40 to 60 weight percent of a polyamide; 3 to 13 weight percent of a poly(phenylene ether); 12 to 18 weight percent of a flame retardant comprising a metal dialkylphosphinate, melamine polyphosphate, and zinc borate; 0.1 to 2 weight percent of a compatibilizing agent for the polyamide and the poly(phenylene ether); and 20 to 40 weight percent glass fibers; wherein all weight percents are based on the total weight of the polyamide composition.

Another embodiment is an article comprising a composition comprising the product of melt blending: 40 to 60 weight percent of a polyamide; 3 to 13 weight percent of a poly(phenylene ether); 12 to 18 weight percent of a flame retardant comprising a metal dialkylphosphinate, melamine polyphosphate, and zinc borate; 0.1 to 2 weight percent of a compatibilizing agent for the polyamide and the poly(phenylene ether); and 20 to 40 weight percent glass fibers; wherein all weight percents are based on the total weight of the polyamide composition.

Another embodiment is a method of reducing the metal dialkylphosphinate content of a flame retardant polyamide composition, comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

These and other embodiments are described in detail below.

DETAILED DESCRIPTION OF THE INVENTION

The present inventors have identified a glass filled polyamide composition with reduced metal dialkylphosphinate content that exhibits desirable flame retardancy melt flow, heat resistance, and mechanical properties. The composition can be prepared by a compounding method that utilizes a specific poly(phenylene ether) masterbatch. The composition benefits from a poly(phenylene ether) flame retardant synergist effect while avoiding the use of difficult-to-handle poly(phenylene ether) powders.

As a flammability property, the polyamide composition can exhibit a rating of V-0 or V-1 at a sample thickness of 0 8 millimeters in the Underwriter's Laboratory Bulletin 94 "Tests for Flammability of Plastic Materials, UL 94", 20 mm Vertical Burning Flame Test.

As a melt flow property, the polyamide composition can exhibit a melt viscosity less than or equal to 251 pascal-seconds, determined according to ISO 11443:2005, using a temperature of 282° C. and a shear rate of 1,500 second$^{-1}$. In some embodiments, the melt viscosity is 100 to 250 pascal-seconds, specifically 100 to 160 pascal-seconds.

As a stiffness property, the polyamide composition can exhibit a flexural modulus of at least 7200 megapascals, determined at 23° C. according to ISO 178:2010 using bar cross-sectional dimensions of 80 millimeters by 10 millimeters by 4 millimeters, a support span of 64 millimeters, and three specimens per composition. In some embodiments, the flexural modulus is 7200 to 9000 megapascals, specifically 7900 to 9000 megapascals.

As a ductility property, the polyamide composition can exhibit a notched Izod impact strength of at least 8.3 kilojoules/meter$^2$, determined at 23° C. according to ISO 180: 2000 using a Type A radius and a notch angle of 45 degrees and an 8 millimeter depth of material under the notch, a hammer energy of 2.75 joules, bar cross-sectional dimensions of 10 millimeters by 4 millimeters, and ten samples per composition. In some embodiments the notched Izod impact strength is 8.3 to 10 kilojoules/meter$^2$, specifically 8.5 to 10 kilojoules/meter$^2$.

As a heat resistance property, the polyamide composition can exhibit a Vicat softening temperature of at least 200° C., determined according to ISO 306:2004 using Method B120, a needle penetration of 1 millimeter at reading, a pre-loading time of 5 minutes, and three specimens per composition. In some embodiments the Vicat softening temperature is 200 to 250° C., specifically 240 to 250° C.

In some embodiments the polyamide composition exhibits a UL 94 rating of V-0, a melt viscosity of 100 to 160 pascal-seconds, a flexural modulus of 7900 to 9000 megapascals, a notched Izod impact strength of 8.5 to 10 kilojoules/meter$^2$, and a Vicat softening temperature of 240 to 250° C.

One embodiment is a method of forming a polyamide composition, the method comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

Melt blending is used to form both the poly(phenylene ether) masterbatch and the polyamide composition. Melt-blending (also known as melt-kneading) can be performed using common equipment such as ribbon blenders, Henschel mixers, Banbury mixers, drum tumblers, single-screw extruders, twin-screw extruders, multi-screw extruders, co-kneaders, and the like. Formation of the poly(phenylene ether) masterbatch can be conducted, for example, by melt-blending the poly(phenylene ether), the second polyamide, and any optional components in a twin-screw extruder at a temperature of 230 to 310° C., specifically 240 to 300° C. Formation of the polyamide composition can be conducted, for example, by melt blending the poly(phenylene ether) masterbatch, the first polyamide, the glass fibers, and the flame retardant at a temperature of 230 to 290° C., specifically 250 to 270° C.

The poly(phenylene ether) masterbatch comprises a poly(phenylene ether). Poly(phenylene ether)s include those comprising repeating structural units having the formula

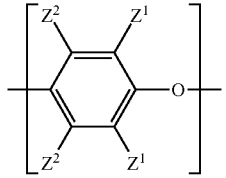

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

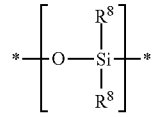

wherein each occurrence of $R^8$ is independently hydrogen, $C_1$-$C_{12}$ hydrocarbyl or $C_1$-$C_{12}$ halohydrocarbyl; and two terminal units having the structure

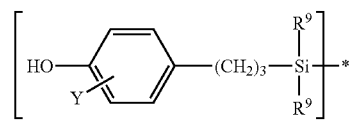

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

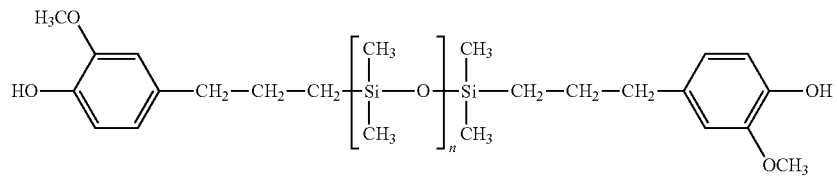

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al., and U.S. patent application Ser. No. 13/169,137 of Carrillo et al., filed Jun. 27, 2011.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, specifically 0.35 to 0.5 deciliter per gram, more specifically 0.4 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the polyamide composition.

Based on the weight of the poly(phenylene ether) masterbatch, the poly(phenylene ether) amount is 35 to 97 weight percent. Within this range, the poly(phenylene ether) amount can be 50 to 97 weight percent, specifically 75 to 96.5 weight percent, more specifically 85 to 95 weight percent.

Based on the weight of the polyamide composition, the poly(phenylene ether) amount can be 1.75 to 29.1 weight percent. Within this range, the poly(phenylene ether) amount can be 3 to 20 weight percent, specifically 5 to 15 weight percent, more specifically 3 to 13 weight percent. In some embodiments, the polyamide composition comprises less than or equal to 19 weight percent, specifically less than or equal to 17 weight percent, more specifically less than or equal to 15 weight percent poly(phenylene ether). In some embodiments, the polyamide composition comprises less than or equal to 13 weight percent, specifically less than or equal to 11 weight percent poly(phenylene ether).

The polyamide composition comprises a first polyamide and a second polyamide that can be the same or different. Polyamides, also known as nylons, are characterized by the presence of a plurality of amide (—C(O)NH—) groups and are described in U.S. Pat. No. 4,970,272 to Gallucci. Polyamides suitable for use in the present method as the first polyamide or the second polyamide include polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, and combinations thereof. In some embodiments, the first polyamide and/or the second polyamide comprises polyamide-6. In some embodiments, the first polyamide and/or the second polyamide comprises polyamide-6,6. In some embodiments, the first polyamide comprises polyamide-6,6, and the second polyamide comprises polyamide-6. In some embodiments, the first polyamide and the second polyamide comprise polyamide-6,6.

Polyamides can be prepared by a number of known processes, and polyamides are commercially available from a variety of sources.

Based on the weight of the poly(phenylene ether) masterbatch, the second polyamide amount is 3 to 65 weight percent. Within this range, the second polyamide amount can be 3 to 40 weight percent, specifically 3 to 20 weight percent, more specifically 3 to 10 weight percent.

Based on the weight of the polyamide composition, the second polyamide amount can be 0.15 to 19.5 weight percent. Within this range, the second polyamide amount can be 0.2 to 5 weight percent, specifically 0.2 to 2 weight percent, more specifically 0.2 to 1 weight percent.

Based on the weight of the polyamide composition, the first polyamide amount is 35 to 70 weight percent. Within this range, the first polyamide amount can be 40 to 65 weight percent, specifically 45 to 55 weight percent.

Based on the weight of the polyamide composition, the total polyamide amount (that is, the sum of the first polyamide amount and the second polyamide amount) can be 35.15 to 73.25 weight percent. Within this range, the total polyamide amount can be 40 to 60 weight percent, specifically 45 to 55 weight percent. In some embodiments, the polyamide composition comprises less than or equal to 52 weight percent, specifically less than or equal to 50 weight percent, of the first polyamide and the second polyamide combined.

The poly(phenylene ether) masterbatch can, optionally, further comprise a compatibilizing agent for the poly(phenylene ether) and the second polyamide. As used herein, the term "compatibilizing agent" refers to a polyfunctional compound that interacts with the poly(phenylene ether), the second polyamide, or both. This interaction can be chemical (for example, grafting) and/or physical (for example, affecting the surface characteristics of the dispersed phases).

Examples of compatibilizing agents that can be employed include liquid diene polymers, epoxy compounds, oxidized polyolefin wax, quinones, organosilane compounds, polyfunctional compounds, and combinations thereof. Compatibilizing agents are further described in U.S. Pat. Nos. 5,132,365 to Gallucci, and 6,593,411 and 7,226,963 to Koevoets et al.

In some embodiments, the compatibilizing agent comprises a polyfunctional compound. Polyfunctional compounds that can be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, or the like; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, and the like); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer from 10 to 30); unsaturated amines resulting from replacing from replacing the —OH group(s) of the above unsaturated alcohols with —NH$_2$ group(s); functionalized diene polymers and copolymers; and combinations comprising one or more of the foregoing. In some embodiments, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which can be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

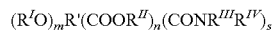

wherein R' is a linear or branched chain, saturated aliphatic hydrocarbon having 2 to 20, or, more specifically, 2 to 10, carbon atoms; R' is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In some embodiments, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In some embodiments, the compatibilizing agent comprises trimellitic anhydride acid chloride.

The foregoing compatibilizing agents can be added directly to the other components of the poly(phenylene ether) masterbatch, or pre-reacted with the poly(phenylene ether). With many of the foregoing compatibilizing agents, particularly the polyfunctional compounds, improvement in compatibility is found when at least a portion of the compatibilizing agent is pre-reacted with all or a part of the poly (phenylene ether). It is believed that such pre-reacting may cause the compatibilizing agent to react with and consequently functionalize the poly(phenylene ether). For example, the poly(phenylene ether) can be pre-reacted with citric acid or maleic anhydride to form an acid-functionalized poly(phenylene ether) that has improved compatibility with the first and second polyamides compared to a non-functionalized poly(phenylene ether).

When a compatibilizing agent is employed in the preparation of the compatibilized polyamide-poly(phenylene ether) blend, the amount used will be dependent upon the specific compatibilizing agent chosen and the specific poly(phenylene ether) and second polyamide to which it is added. In some embodiments, the compatibilizing agent amount is 0.2 to 5 weight percent, specifically 0.5 to 4 weight percent, more specifically 1 to 3 weight percent, based on the weight of the poly(phenylene ether) masterbatch.

As demonstrated in the working examples below, the poly (phenylene ether) masterbatch can be prepared without a compatibilizing agent without unduly compromising the properties of the resulting polyamide composition.

The poly(phenylene ether) masterbatch can, optionally, further comprise one or more additives known in the thermoplastics art. For example, the poly(phenylene ether) masterbatch can, optionally, further comprise an additive chosen from stabilizers, lubricants, processing aids, drip retardants, nucleating agents, UV blockers, dyes, pigments, antioxidants, anti-static agents, metal deactivators, antiblocking agents, and the like, and combinations thereof. When present, such additives are typically used in a total amount of less than or equal to 5 weight percent, specifically less than or equal to 2 weight percent, more specifically less than or equal to 1 weight percent, based on the weight of the poly(phenylene ether) masterbatch.

The poly(phenylene ether) masterbatch is used in an amount of 5 to 30 weight percent, based on the weight of the polyamide composition. Within this range, the poly(phenylene ether) masterbatch amount can be 5 to 25 weight percent, specifically 5 to 15 weight percent. In addition to the poly(phenylene ether) masterbatch and the first polyamide, the polyamide composition comprises glass fibers. Suitable glass fibers include those based on E, A, C, ECR, R, S, D, and NE glasses, as well as quartz. In some embodiments, the glass fiber has a diameter of 2 to 30 micrometers, specifically 5 to 25 micrometers, more specifically 8 to 15 micrometers. In some embodiments, the length of the glass fibers before compounding is 2 to 7 millimeters, specifically 3 to 5 millimeters. The glass fiber can, optionally, include a so-called adhesion promoter to improve its compatibility with the poly(phenylene ether) and the polystyrene. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville.

The polyamide composition comprises the glass fibers in an amount of 15 to 40 weight percent, based on the weight of the polyamide composition. Within this range, the glass fiber amount can be 18 to 35 weight percent, specifically 20 to 30 weight percent.

In addition to the poly(phenylene ether) masterbatch, the first polyamide, and the glass fibers, the polyamide composition comprises a flame retardant. The flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

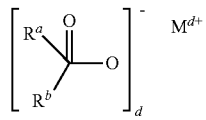

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, iso-propyl, n-butyl, tert-butyl, n-pentyl, and phenyl. In some embodiments, $R^a$ and $R^b$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles can have a median particle diameter (D50) less than or equal to 40 micrometers, or, more specifically, a D50 less than or equal to 30 micrometers, or, even more specifically, a D50 less than or equal to 25 micrometers.

The amount of flame retardant is 10 to 20 weight percent, based on the weight of the polyamide composition. Within this range, the flame retardant amount can be 12 to 18 weight percent, specifically 13 to 17 weight percent. The amount of metal dialkylphosphinate can be 5 to 20 weight percent, based on the weight of the polyamide composition. Within this range, the amount of metal dialkylphosphinate can be 6 to 15 weight percent, specifically 7 to 13 weight percent. When the amount of metal dialkylphosphinate is less than 10 weight percent, it is used in conjunction with another flame retardant so that the total flame retardant amount is at least 10 weight percent.

In some embodiments, the flame retardant further comprises melamine polyphosphate. In some embodiments, the flame retardant further comprises zinc borate. In some embodiments, the flame retardant further comprises melamine polyphosphate and zinc borate. In some embodiments, the flame retardant comprises, based on the total weight of the flame retardant, 50 to 76 weight percent, specifically 55 to 70 weight percent, metal dialkylphosphinate; 22 to 49 weight percent, specifically 25 to 40 weight percent, melamine polyphosphate, and 2 to 8 weight percent, specifically 3 to 7 weight percent, zinc borate. In some embodiments, the polyamide composition comprises 6 to 13 weight percent of the metal dialkylphosphinate and further comprises 3 to 7 weight percent melamine polyphosphate, and 0.2 to 2 weight percent zinc borate, based on the weight of the polyamide composition.

The polyamide composition can, optionally, further include a compatibilizing agent for the poly(phenylene ether) and the first polyamide. This compatibilizing agent can be the same as or different from any compatibilizing agent used in preparation of the poly(phenylene ether) masterbatch. The compatibilizing agents described above in the context of the poly(phenylene ether) masterbatch are suitable for compatibilizing the poly(phenylene ether) masterbatch and the first polyamide. In some embodiments, the compatibilizing agent used in the melt blending of the first polyamide and the poly(phenylene ether) masterbatch comprises citric acid, fumaric acid, maleic acid, maleic anhydride, or a combination of at least two of the foregoing. When present, the compatibilizing agent used in the melt blending of the first polyamide and the poly(phenylene ether) masterbatch can be used in an amount of 0.1 to 5 weight percent, specifically 0.2 to 3 weight percent, based on the weight of the polyamide composition. In some embodiments, the polyamide composition does not contain any compatibilizing agent other than that contained in the poly(phenylene ether) masterbatch. In some embodiments, the polyamide composition does not contain any compatibilizing agent.

The polyamide composition can, optionally, further include one or more additives in addition to any additives that may have been included in the poly(phenylene ether) masterbatch. For example, the polyamide composition can, optionally, further comprise an additive chosen from stabilizers, mold release agents, lubricants, processing aids, drip retardants, nucleating agents, UV blockers, dyes, pigments, anti-oxidants, anti-static agents, mineral oil, metal deactivators, antiblocking agents, and the like, and combinations thereof. When present, such additives are typically used in a total amount of less than or equal to 5 weight percent, specifically less than or equal to 2 weight percent, more specifically less than or equal to 1 weight percent, based on the total weight of the polyamide composition. Aluminum stearate is a particularly suitable lubricant.

In some embodiments, the polyamide composition excludes electrically conductive fillers. For example, for many electrical and electronic applications, it is desirable for the polyamide composition to exhibit minimal electrical conductivity.

In some embodiments, the polyamide composition excludes impact modifiers. For many product applications, the ductility of the polyamide composition is sufficient without using impact modifiers.

In a very specific method of forming a polyamide composition, the method comprises: melt blending components comprising, based on the weight of the polyamide composition, 5 to 14 weight percent of a poly(phenylene ether) masterbatch, 45 to 55 weight percent of a first polyamide comprising polyamide-6,6, 20 to 30 weight percent glass fibers, and 12 to 18 weight percent of a flame retardant comprising a metal dialkylphosphinate, melamine polyphosphate, and zinc borate to form the polyamide composition; wherein the poly (phenylene ether) masterbatch is the product of melt blending components comprising, based on the weight of the poly (phenylene ether) masterbatch, 75 to 96.5 weight percent poly(phenylene ether) comprising a homopolymer or copolymer of monomers selected from the group consisting of 2,6-dimethylphenol, 2,3,6-trimethylphenol, and combinations thereof, 3 to 24.5 weight percent of a second polyamide comprising polyamide-6,6, and 0.5 to 4 weight percent of a compatibilizing agent for the poly(phenylene ether) and the second polyamide; wherein the polyamide composition comprises less than or equal to 13 weight percent poly(phenylene ether), based on the total weight of the composition; and wherein the polyamide composition excludes electrically conductive fillers and impact modifiers. In some embodiments, the poly(phenylene ether) further comprises a poly (phenylene ether)-polysiloxane block copolymer.

The invention includes polyamide compositions prepared according to all the variations of the method described above.

Another embodiment is a polyamide composition, comprising the product of melt blending: 40 to 60 weight percent of a polyamide; 3 to 13 weight percent of a poly(phenylene ether); 12 to 18 weight percent of a flame retardant comprising a metal dialkylphosphinate, melamine polyphosphate, and zinc borate; 0.1 to 2 weight percent of a compatibilizing agent for the polyamide and the poly(phenylene ether); and 20 to 40 weight percent glass fibers; wherein all weight percents are based on the total weight of the polyamide composition. Such a composition can be formed by the method described above. The polyamide and the poly(phenylene ether) can be chosen from any of those described above in the context of the method.

In a very specific embodiment of the polyamide composition, the polyamide comprises polyamide-6,6; the polyamide composition comprises 45 to 55 weight percent of the polyamide; the poly(phenylene ether) comprises a homopolymer or copolymer of monomers selected from the group consisting of 2,6-dimethylphenol, 2,3,6-trimethylphenol, and combinations thereof; the polyamide composition comprises 6 to 12 weight percent of the poly(phenylene ether); the flame retardant comprises 6 to 13 weight percent of the metal dialkylphosphinate, 3 to 7 weight percent of the melamine polyphosphate, and 0.2 to 2 weight percent of the zinc borate; and the composition comprises 20 to 30 weight percent glass fibers. In some embodiments, the poly(phenylene ether) further comprises a poly(phenylene ether)-polysiloxane block copolymer.

Another embodiment is an article comprising any of the polyamide compositions described herein. The polyamide composition is suitable for forming electrical and electronic components, in particular, circuit breakers (including mini circuit breakers); residual circuit devices; switches; sockets; industrial plugs; electrical connectors (including connectors for the automotive, telecommunications, data communications, computer, and electronic equipment industries); switch gear for automotive, computer, telecommunications, and mobile phone industries; parts for heating, ventilation, and cooling systems; mechanical parts; and parts for consumer and industrial goods. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

In a very specific embodiment of the article, the polyamide comprises polyamide-6,6; the polyamide composition comprises 45 to 55 weight percent of the polyamide; the poly (phenylene ether) comprises a homopolymer or copolymer of monomers selected from the group consisting of 2,6-dimethylphenol, 2,3,6-trimethylphenol, and combinations thereof; the polyamide composition comprises 6 to 12 weight percent of the poly(phenylene ether); the flame retardant comprises 6 to 13 weight percent of the metal dialkylphosphinate, 3 to 7 weight percent of the melamine polyphosphate, and 0.2 to 2 weight percent of the zinc borate; and the composition comprises 20 to 30 weight percent glass fibers. In some embodiments, the poly(phenylene ether) further comprises a poly (phenylene ether)-polysiloxane block copolymer.

The invention includes the poly(phenylene ether) masterbatch. Thus, one embodiment is a poly(phenylene ether) masterbatch comprising the product of melt blending components comprising, based on the weight of the poly(phenylene ether) masterbatch: 92 to 97 weight percent of a poly(phenylene ether); 3 to 4.8 weight percent of a polyamide; and optionally, 0.1 to 5 weight percent of a compatibilizing agent for the poly(phenylene ether) and the polyamide. In some embodiments, the poly(phenylene ether) masterbatch comprises 0.5 to 3 weight percent of the compatibilizing agent. Other than the component amounts specified in this paragraph, all of the compositional variations of the poly(phenylene ether) masterbatch described above apply to the poly(phenylene ether) masterbatch of this paragraph. For example, the polyamide of the present masterbatch corresponds to the second polyamide described above. In some embodiments, the melt blended components further comprise 0.2 to 0.5 weight percent of additives selected from the group consisting of antioxidants, stabilizers, and combinations thereof. In some embodiments, the poly(phenylene ether) masterbatch consists of the poly (phenylene ether), the polyamide, optionally the compatibilizing agent, and optionally 0.2 to 0.5 weight percent of additives selected from the group consisting of antioxidants, stabilizers, and combinations thereof.

In a very specific embodiment of the poly(phenylene ether) masterbatch, the poly(phenylene ether) comprises a homopolymer or copolymer of monomers selected from the group consisting of 2,6-dimethylphenol, 2,3,6-trimethylphenol, and combinations thereof; the melt blended components comprise 92 to 95 weight percent of the poly(phenylene ether); the polyamide comprises polyamide-6,6; the melt blended components comprise 4 to 4.8 weight percent of the polyamide; the compatibilizing agent is selected from the group consisting of citric acid, maleic acid, maleic anhydride, and combinations thereof; and the melt blended components comprise 0.5 to 3 weight percent of the compatibilizing agent. In this embodiment, the poly(phenylene ether) masterbatch can, optionally, further comprise 0.2 to 0.5 weight percent of additives selected from the group consisting of antioxidants, stabilizers, and combinations thereof.

The invention includes use of the poly(phenylene ether) masterbatch to reduce the metal dialkylphosphinate content of a flame retardant polyamide composition. Specifically, one embodiment is a method of reducing the metal dialkylphosphinate content of a flame retardant polyamide composition, comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide. All of the variations described above in the context of the method of forming a polyamide composition are applicable as well to the method of reducing the metal dialkylphosphinate content of a flame retardant polyamide composition.

The invention includes at least the following embodiments.

Embodiment 1

A method of forming a polyamide composition, the method comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

Embodiment 2

The method of embodiment 1, wherein the first polyamide and the second polyamide are independently selected from the group consisting of polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, and combinations thereof.

Embodiment 3

The method of embodiment 1, wherein the first polyamide and the second polyamide are independently selected from the group consisting of polyamide-6, polyamide-6,6, and combinations thereof.

Embodiment 4

The method of embodiment 1, wherein the first polyamide and the second polyamide comprise polyamide-6,6.

Embodiment 5

The method of any of embodiments 1-4, wherein the polyamide composition comprises less than or equal to 52 weight percent of the first polyamide and the second polyamide combined.

Embodiment 6

The composition of any of embodiments 1-5, wherein the poly(phenylene ether) comprises a homopolymer or copolymer of monomers selected from the group consisting of 2,6-dimethylphenol, 2,3,6-trimethylphenol, and combinations thereof Embodiment 7

The method of any of embodiments 1-6, wherein the poly(phenylene ether) comprises a poly(phenylene ether)-polysiloxane block copolymer.

Embodiment 8

The method of any of embodiments 1-7, wherein the polyamide composition comprises less than or equal to 19 weight percent poly(phenylene ether), based on the weight of the polyamide composition.

Embodiment 9

The method of any of embodiments 1-8, wherein the polyamide composition comprises less than or equal to 13 weight percent poly(phenylene ether), based on the weight of the polyamide composition.

Embodiment 10

The method of any of embodiments 1-9, wherein the flame retardant further comprises melamine polyphosphate.

Embodiment 11

The method of any of embodiments 1-10, wherein the flame retardant further comprises zinc borate.

Embodiment 12

The method of any of embodiments 1-11, wherein the flame retardant comprises, based on the weight of the polyamide composition, 6 to 13 weight percent of the metal dialkylphosphinate and further comprises 3 to 7 weight percent melamine polyphosphate, and 0.2 to 2 weight percent zinc borate.

Embodiment 13

The method of any of embodiments 1-12, wherein the poly(phenylene ether) masterbatch further comprises, based on the weight of the poly(phenylene ether) masterbatch, 0.2 to 5 weight percent of a compatibilizing agent for the poly(phenylene ether) and the second polyamide.

Embodiment 14

The method of any of embodiments 1-13, wherein the polyamide composition excludes electrically conductive fillers.

Embodiment 15

The method of any of embodiments 1-14, wherein the polyamide composition excludes impact modifiers.

Embodiment 16

A method of forming a polyamide composition, the method comprising: melt blending components comprising, based on the weight of the polyamide composition, 5 to 14 weight percent of a poly(phenylene ether) masterbatch, 45 to 55 weight percent of a first polyamide comprising polyamide-6,6, 20 to 30 weight percent glass fibers, and 12 to 18 weight percent of a flame retardant comprising a metal dialkylphosphinate, melamine polyphosphate, and zinc borate to form the polyamide composition; wherein the poly(phenylene ether) masterbatch is the product of melt blending components comprising, based on the weight of the poly(phenylene ether) masterbatch, 75 to 96.5 weight percent poly(phenylene ether) comprising a homopolymer or copolymer of monomers selected from the group consisting of 2,6-dimethylphenol, 2,3,6-trimethylphenol, and combinations thereof, 3 to 24.5 weight percent of a second polyamide comprising polyamide-6,6, and 0.5 to 4 weight percent of a compatibilizing agent for the poly(phenylene ether) and the second polyamide; wherein the polyamide composition comprises less than or equal to 13 weight percent poly(phenylene ether), based on the total weight of the composition; and wherein the polyamide composition excludes electrically conductive fillers and impact modifiers.

Embodiment 17

The method of embodiment 16, wherein the poly(phenylene ether) further comprises a poly(phenylene ether)-polysiloxane block copolymer.

Embodiment 18

A polyamide composition prepared according to the method of any of embodiments 1-17.

Embodiment 19

A polyamide composition, comprising the product of melt blending: 40 to 60 weight percent of a polyamide; 3 to 13 weight percent of a poly(phenylene ether); 12 to 18 weight percent of a flame retardant comprising a metal dialkylphosphinate, melamine polyphosphate, and zinc borate; 0.1 to 2 weight percent of a compatibilizing agent for the polyamide and the poly(phenylene ether); and 20 to 40 weight percent glass fibers; wherein all weight percents are based on the total weight of the polyamide composition.

Embodiment 20

The polyamide composition of embodiment 19, wherein the polyamide comprises polyamide-6,6; wherein the polyamide composition comprises 45 to 55 weight percent of the polyamide; wherein the poly(phenylene ether) comprises a homopolymer or copolymer of monomers selected from the group consisting of 2,6-dimethylphenol, 2,3,6-trimethylphenol, and combinations thereof; wherein the polyamide composition comprises 6 to 12 weight percent of the poly(phenylene ether); wherein the flame retardant comprises 6 to 13 weight percent of the metal dialkylphosphinate, 3 to 7 weight percent of the melamine polyphosphate, and 0.2 to 2 weight percent of the zinc borate; and wherein the composition comprises 20 to 30 weight percent glass fibers.

Embodiment 21

The polyamide composition of embodiment 20, wherein the poly(phenylene ether) further comprises a poly(phenylene ether)-polysiloxane block copolymer.

Embodiment 22

An article comprising a composition comprising the product of melt blending: 40 to 60 weight percent of a polyamide; 3 to 13 weight percent of a poly(phenylene ether); 12 to 18 weight percent of a flame retardant comprising a metal dialkylphosphinate, melamine polyphosphate, and zinc borate; 0.1 to 2 weight percent of a compatibilizing agent for the polyamide and the poly(phenylene ether); and 20 to 40 weight percent glass fibers; wherein all weight percents are based on the total weight of the polyamide composition.

Embodiment 23

A method of reducing the metal dialkylphosphinate content of a flame retardant polyamide composition, comprising: melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition; wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

Embodiment 24

A poly(phenylene ether) masterbatch comprising the product of melt blending components comprising, based on the weight of the poly(phenylene ether) masterbatch: 92 to 97 weight percent of a poly(phenylene ether); 3 to 4.8 weight percent of a polyamide; and optionally, 0.1 to 5 weight percent of a compatibilizing agent for the poly(phenylene ether) and the polyamide.

Embodiment 25

The poly(phenylene ether) masterbatch of embodiment 24, comprising 0.5 to 3 weight percent of the compatibilizing agent.

Embodiment 26

The poly(phenylene ether) masterbatch of embodiment 24 or 25, wherein the melt blended components further comprise 0.2 to 0.5 weight percent of additives selected from the group consisting of antioxidants, stabilizers, and combinations thereof.

Embodiment 27

The poly(phenylene ether) masterbatch of any of embodiments 24-26, consisting of the poly(phenylene ether), the polyamide, optionally the compatibilizing agent, and optionally 0.2 to 0.5 weight percent of additives selected from the group consisting of antioxidants, stabilizers, and combinations thereof.

Embodiment 28

The poly(phenylene ether) masterbatch of embodiment 24, wherein the poly(phenylene ether) comprises a homopolymer or copolymer of monomers selected from the group consisting of 2,6-dimethylphenol, 2,3,6-trimethylphenol, and combinations thereof; wherein the melt blended components comprise 92 to 95 weight percent of the poly(phenylene ether); wherein the polyamide comprises polyamide-6,6; wherein the melt blended components comprise 4 to 4.8 weight percent of the polyamide; wherein the compatibilizing agent is selected from the group consisting of citric acid, maleic acid, maleic anhydride, and combinations thereof; wherein the melt blended components comprise 0.5 to 3 weight percent of the compatibilizing agent.

Embodiment 29

The poly(phenylene ether) masterbatch of embodiment 28, wherein the melt blended components further comprise 0.2 to 0.5 weight percent of additives selected from the group consisting of antioxidants, stabilizers, and combinations thereof.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Preparative Examples 1-12

These examples illustrate the preparation of masterbatches.

Components used to form the masterbatches, as well as the compositions described in the following examples, are summarized in Table 1.

TABLE 1

| Component | Description |
|---|---|
| PPE | Poly(2,6-dimethyl-1,4-phenylene ether), CAS Reg. No. 24938-67-8, having an intrinsic viscosity of about 0.4 deciliter per gram as measured in chloroform at 25° C.; obtained as PPO 803 from SABIC's Innovative Plastics business. |
| PPE-Si | A mixture of poly(2,6-dimethyl-1,4-phenylene ether) (CAS Reg. No. 24938-67-8) and poly(2,6-dimethyl-1,4-phenylene ether)-polydimethylsiloxane block copolymer (CAS Reg. No. 1202019-56-4), the mixture having a polysiloxane content of about 5 weight percent and an intrinsic viscosity of about 0.4 deciliter per gram as measured in chloroform at 25° C.; prepared according to the procedure of U.S. Pat. No. 8,017,697 to Carrillo et al., Example 16. |
| PA6 | Polyamide-6, CAS Reg. No. 25038-54-4, having a relative viscosity of about 127 measured in 90% formic acid according to ASTM D789, and an amine end group concentration of about 102 microequivalents per gram; obtained in pellet form as RADIPOL S24HA from Radici |
| PA66 pellets | Polyamide-6,6, CAS Reg. No. 32131-17-2, having a relative viscosity of about 126 measured in 90% formic acid according to ASTM D789, and an amine end group concentration of about 51 microequivalents per gram; obtained in pellet form as STABAMID 24FE1 from Rhodia. |
| PA66 powder | Polyamide-6,6, CAS Reg. No. 32131-17-2, having a relative viscosity of about 126 measured in 90% formic acid according to ASTM D789, and an amine end group concentration of about 51 microequivalents per gram; obtained in pellet form as STABAMID 24FE1 from Rhodia and milled to a powder. |
| Antioxidant | N,N'-Hexamethylene bis[3-(3,5-di-t-butyl-4-hydroxyphenyl) propionamide], CAS Reg. No. 2328-74-7; obtained as IRGANOX 1098 from BASF. |
| Stabilizer | Tris(2,4-di-tert-butylphenyl)phosphite, CAS Reg. No. 31570-04-4; obtained as IRGAFOS 168 from BASF. |
| CA | Citric acid, CAS Reg. No. 77-92-9. |
| OP1312 | A flame retardant mixture of about 63 weight percent aluminum tris(diethylphosphinate), about 32 weight percent melamine polyphosphate, and about 5 weight percent zinc borate; obtained as EXOLIT OP 1312 from Clariant. |
| AlSt | Aluminum stearate, CAS Reg. No. 97404-28-9, obtained from SOGIS INDUSTRIA CHIMICA S.A. |
| GF | Chopped glass fiber having a diameter of about 10 micrometers, surface treated with a silane sizing for compatibility with polyamide; obtained as CHOPVANTAGE HP 3660 from PPG. |

Poly(phenylene ether) masterbatches were prepared using a 28 millimeter internal diameter ZSK twin-screw extruder at a melt temperature of 240-300° C. and throughput of 15 kilograms/hour. PPE or PPE-Si in powder form was dry blended with antioxidant and stabilizer and citric acid, then the resulting dry blend was introduced in the first feeder at the throat of the extruder, while PA66 or PA6 was fed via a second feeder downstream. Masterbatch compositions are summarized in Table 2, where component amounts are expressed in parts by weight.

TABLE 2

|  | P. Ex. 1 | P. Ex. 2 | P. Ex. 3 | P. Ex. 4 | P. Ex. 5 | P. Ex. 6 |
|---|---|---|---|---|---|---|
| PPE | 100.00 | 100.00 | 100.00 | 100.00 | 0.00 | 0.00 |
| PPE-Si | 0.00 | 0.00 | 0.00 | 0.00 | 100.00 | 100.00 |
| Antioxidant | 0.2 | 0.2 | 0.2 | 0.2 | 0.2 | 0.2 |
| Stabilizer | 0.15 | 0.15 | 0.15 | 0.15 | 0.15 | 0.15 |
| CA | 2.00 | 0.00 | 0.70 | 2.00 | 2.00 | 0.00 |
| PA66 | 0.00 | 5.00 | 5.00 | 5.00 | 0.00 | 5.00 |
| PA6 | 0.00 | 0.00 | 0.00 | 0.00 | 0.00 | 0.00 |
|  | P. Ex. 7 | P. Ex. 8 | P. Ex. 9 | P. Ex. 10 | P. Ex. 11 | P. Ex. 12 |
| PPE | 0.00 | 0.00 | 39.40 | 0.00 | 100.00 | 0.00 |
| PPE-Si | 100.00 | 100.00 | 0.00 | 39.40 | 0.00 | 100.00 |
| Antioxidant | 0.2 | 0.2 | 0.2 | 0.2 | 0.2 | 0.2 |
| Stabilizer | 0.15 | 0.15 | 0.15 | 0.15 | 0.15 | 0.15 |
| CA | 0.70 | 2.00 | 0.70 | 0.70 | 0.70 | 0.70 |
| PA66 | 5.00 | 5.00 | 59.55 | 59.55 | 0.00 | 0.00 |
| PA6 | 0.00 | 0.00 | 0.00 | 0.00 | 5.00 | 5.00 |

Examples 1-8

Comparative Examples 1-5

These examples illustrate compositions prepared with poly(phenylene ether) masterbatches containing polyamide-6,6. The examples show that flame-retardant polyamide concentrations can be prepared with reduced concentrations of flame retardant additive and without utilizing difficult-to-handle poly(phenylene ether) powders.

Polyamide compositions were prepared using a 28 millimeter internal diameter ZSK twin-screw extruder operating at a melt temperature of 250-270° C. and throughput of 15 kilograms/hour. Masterbatches were mixed together with additional stabilizers and citric acid by hand shaking in bags, and the resulting dry blends were introduced at the throat of the extruder in the first feeder. PA66 was fed to the extruder via a second feeder downstream of the first feeder, and glass fibers were introduced via a third feeder downstream of the second feeder.

Test articles for physical testing were injection molded using a barrel temperature of 250-290° C., and a mold temperature of 80-100° C.

Melt viscosity testing was performed according to ISO 11443:2005, using a temperature of 282° C. and the multi-point method where melt viscosity at various shear rates was measured. In Table 2, melt viscosity values having units of Pascal-seconds were measured at a shear rate of 1,500 second$^{-1}$.

Tensile modulus values, expressed in units of megapascals, and tensile strain at break values, expressed in percent, were determined at 23° C. according to ISO 527-1:2012 using a Type 1A bar having dimensions of 80 millimeters by 10 millimeters by 4 millimeters, a gage length of 50 millimeters, a grip separation of 115 millimeters, a test speed of 1 millimeter/minute, and five samples per composition.

Flexural modulus and flexural strength, expressed in units of megapascals, were determined at 23° C. according to ISO 178:2010 using bar cross-sectional dimensions of 80 millimeters by 10 millimeters by 4 millimeters, a support span of 64 millimeters, and three specimens per composition.

Izod notched impact strength values, expressed in units of kilojoules/meter$^2$, were determined at 23° C. and -30° C. according to ISO 180:2000 using a Type A radius and a notch angle of 45 degrees and an 8 millimeter depth of material under the notch, a hammer energy of 2.75 joules, bar cross-sectional dimensions of 10 millimeters by 4 millimeters, and ten samples per composition.

Vicat softening temperature values, expressed in units of degrees centigrade, were determined according to ISO 306:2004 using Method B120, a needle penetration of 1 millimeter at reading, a pre-loading time of 5 minutes, and three specimens per composition.

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 0.8 millimeters were conditioned at 23° C. and 50% relative humidity for at least 48 hours. The test was modified to use a set of ten flame bars rather than the usual five. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for at least nine out of ten individual specimen must have been less than or equal to 10 seconds (the ratings in Table 2 note the compositions for which one of the ten individual specimens had an afterflame time greater than 10 seconds); and the total afterflame time for all ten specimens (t1 plus t2 for all ten specimens) must have been less than or equal to 100 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all ten specimens (t1 plus t2 for all ten specimens) must have been less than or equal to 500 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating of V-2, the afterflame times t1 and t2 for each individual specimen must have been less than or equal to 30 seconds; and the total afterflame time for all ten specimens (t1 plus t2 for all ten specimens) must have been less than or equal to 250 seconds; and the second afterflame time plus the afterglow time for each individual specimen (t2+t3) must have been less than or equal to 60 seconds; and no specimen can have flamed or glowed up to the holding clamp; but the cotton indicator can have been ignited by flaming particles or drops. Compositions not meeting the V-2 criteria are considered to have failed. In Table 3, "UL 94 TFT (sec)" is the total of t1 values for all ten specimens.

Comparative Tracking Index (CTI) values, express in units of volts, were conducted according to the International Electrotechnical Commission (IEC) standard IEC-60112, Third edition (1979) using test samples having a thickness of 3.2 millimeters and diameter of 10 centimeters, and five samples per composition. The reported value is the voltage that causes tracking after 50 drops of ammonium chloride solution have fallen on the material surface.

Comparative Examples 1 and 2, and Examples 1-3 and 7 illustrate the effect of poly(phenylene ether) added as a powder (Comparative Example 2) or in a masterbatch (Examples 1-3 and 7). The addition of poly(phenylene ether) permits the flame retardant amount to be reduced by about 29 percent (from 21 weight percent to 15 weight percent) while maintaining a desirable V-0 or V-1 rating in the UL 94 flammability test. Examples 2 and 3 utilizing masterbatches with the compatibilizing agent citric acid and a high poly(phenylene ether) content exhibited V-0 ratings. Mechanical properties are also largely preserved relative to Comparative Examples 1 and 2. And the use of masterbatches in Examples 1-3 and 7 avoids the handling difficulties associated with poly(phenylene ether) powder.

Comparative Example 4 and Example 3 illustrate the effect of including polyamide in the poly(phenylene ether) masterbatch. Example 3, with polyamide in the masterbatch, exhibits superior flame retardancy and melt flow relative to Comparative Example 4 without polyamide in the masterbatch.

Comparative Examples 1 and 3, and Examples 4-6 and 8 illustrate the effect of poly(phenylene ether)-polysiloxane block copolymer reaction product as a powder (Comparative Example 3) or in a masterbatch (Examples 4-6 and 8). The addition of poly(phenylene ether)-polysiloxane block copolymer reaction product permits the flame retardant amount to be reduced by about 29 percent (from 21 weight percent to 15 weight percent) while maintaining a desirable V-0 or V-1 rating in the UL 94 flammability test. There is no clear trend associated with compatibilizing agent or poly(phenylene ether)-polysiloxane block copolymer reaction product content, but Examples 4, 6, and 8 all exhibited V-0 ratings. Mechanical properties are also largely preserved relative to Comparative Examples 1 and 3. And the use of masterbatches in Examples 4-6 and 8 avoids the handling difficulties associated with poly(phenylene ether)-polysiloxane reaction product powder.

Examples 1 and 4 illustrate that the benefits of the invention can be obtained even when no compatibilizing agent is used.

TABLE 3

| | C. Ex. 1 | C. Ex. 2 | C. Ex. 3 | C. Ex. 4 | Ex. 1 |
|---|---|---|---|---|---|
| COMPONENTS | | | | | |
| PPE | 0 | 10 | 0 | 0 | 0 |
| PPE-Si | 0 | 0 | 10 | 0 | 0 |
| OP1312 | 21 | 15 | 15 | 15 | 15 |
| Antioxidant | 0.2 | 0.2 | 0.2 | 0.2 | 0.2 |
| AlSt | 0.25 | 0.25 | 0.25 | 0.25 | 0.25 |
| Stabilizer | 0.15 | 0.15 | 0.15 | 0.15 | 0.15 |
| CA | 0.7 | 0.7 | 0.7 | 0 | 0 |
| PA66 powder | 5 | 5 | 5 | 5 | 5 |
| P. Ex. 1 | 0 | 0 | 0 | 10 | 0 |
| P. Ex. 2 | 0 | 0 | 0 | 0 | 10 |
| P. Ex. 3 | 0 | 0 | 0 | 0 | 0 |
| P. Ex. 4 | 0 | 0 | 0 | 0 | 0 |
| P. Ex. 5 | 0 | 0 | 0 | 0 | 0 |
| P. Ex. 6 | 0 | 0 | 0 | 0 | 0 |
| P. Ex. 7 | 0 | 0 | 0 | 0 | 0 |
| P. Ex. 8 | 0 | 0 | 0 | 0 | 0 |
| P. Ex. 9 | 0 | 0 | 0 | 0 | 0 |
| P. Ex. 10 | 0 | 0 | 0 | 0 | 0 |
| PA66 | 47.9 | 43.2 | 43.2 | 43.9 | 43.9 |
| GF | 25.5 | 25.5 | 25.5 | 25.5 | 25.5 |

TABLE 3-continued

| PROPERTIES | | | | | |
|---|---|---|---|---|---|
| MV (Pa-sec) | 122 | 128 | 121 | 164 | 138 |
| Tens. mod. (MPa) | 10100 | 9900 | 9860 | 9900 | 10000 |
| Tens. str. @ break (%) | 3 | 2.5 | 2.8 | 3.1 | 3.1 |
| Flex. mod. (MPa) | 9100 | 8617 | 8496 | 8188 | 8027 |
| Flex. str. (MPa) | — | 209 | 206 | 216 | 210 |
| INI, 23° C. (kJ/m$^2$) | 7.7 | 7.8 | 8.1 | 9.0 | 8.7 |
| INI, −30° C. (kJ/m$^2$) | — | 7.9 | 8.1 | 8.3 | 8.4 |
| Vicat (° C.) | 248 | 245 | 243 | 248 | 248 |
| UL 94, 0.8 mm | V-0 | V-0 | V-0 | V-0* | V-1 |
| UL 94 TFT (sec) | 30 | 47 | 50 | 55 | 71 |
| CTI (V) | 600 | 549 | 541 | 536 | 557 |

| | Ex. 2 | Ex. 3 | C. Ex. 5 | Ex. 4 | Ex. 5 |
|---|---|---|---|---|---|
| COMPONENTS | | | | | |
| PPE | 0 | 0 | 0 | 0 | 0 |
| PPE-Si | 0 | 0 | 0 | 0 | 0 |
| OP1312 | 15 | 15 | 15 | 15 | 15 |
| Antioxidant | 0.2 | 0.2 | 0.2 | 0.2 | 0.2 |
| AlSt | 0.25 | 0.25 | 0.25 | 0.25 | 0.25 |
| Stabilizer | 0.15 | 0.15 | 0.15 | 0.15 | 0.15 |
| CA | 0 | 0 | 0 | 0 | 0 |
| PA66 powder | 5 | 5 | 5 | 5 | 5 |
| P. Ex. 1 | 0 | 0 | 0 | 0 | 0 |
| P. Ex. 2 | 0 | 0 | 0 | 0 | 0 |
| P. Ex. 3 | 10 | 0 | 0 | 0 | 0 |
| P. Ex. 4 | 0 | 10 | 0 | 0 | 0 |
| P. Ex. 5 | 0 | 0 | 10 | 0 | 0 |
| P. Ex. 6 | 0 | 0 | 0 | 10 | 0 |
| P. Ex. 7 | 0 | 0 | 0 | 0 | 10 |
| P. Ex. 8 | 0 | 0 | 0 | 0 | 0 |
| P. Ex. 9 | 0 | 0 | 0 | 0 | 0 |
| P. Ex. 10 | 0 | 0 | 0 | 0 | 0 |
| PA66 | 43.9 | 43.9 | 43.9 | 43.9 | 43.9 |
| GF | 25.5 | 25.5 | 25.5 | 25.5 | 25.5 |
| PROPERTIES | | | | | |
| MV (Pa-sec) | 145 | 154 | 145 | 152 | 138 |
| Tens. mod. (MPa) | 10100 | 9800 | 9800 | 9850 | 9700 |
| Tens. str. @ break (%) | 3.0 | 3.2 | 3.1 | 3.1 | 3.0 |
| Flex. mod. (MPa) | 8428 | 8290 | 8334 | 8264 | 8200 |
| Flex. str. (MPa) | 215 | 221 | 210 | 210 | 209 |
| INI, 23° C. (kJ/m$^2$) | 8.6 | 8.6 | 8.8 | 8.4 | 8.3 |
| INI, −30° C. (kJ/m$^2$) | 8.0 | 8.2 | 6.6 | 7.9 | 4.7 |
| Vicat (° C.) | 245 | 248 | 247 | 248 | 247 |
| UL 94, 0.8 mm | V-0* | V-0 | V-0* | V-0 | V-1 |
| UL 94 TFT (sec) | 54 | 28 | 64 | 48 | 67 |
| CTI (V) | 580 | 536 | 539 | 567 | 547 |

| | Ex. 6 | Ex. 7 | Ex. 8 |
|---|---|---|---|
| COMPONENTS | | | |
| PPE | 0 | 0 | 0 |
| PPE-Si | 0 | 0 | 0 |
| OP1312 | 15 | 15 | 15 |
| Antioxidant | 0.2 | 0.2 | 0.2 |
| AlSt | 0.25 | 0.25 | 0.25 |
| Stabilizer | 0.15 | 0.15 | 0.15 |
| CA | 0 | 0 | 0 |
| PA66 powder | 5 | 5 | 5 |
| P. Ex. 1 | 0 | 0 | 0 |
| P. Ex. 2 | 0 | 0 | 0 |
| P. Ex. 3 | 0 | 0 | 0 |
| P. Ex. 4 | 0 | 0 | 0 |
| P. Ex. 5 | 0 | 0 | 0 |
| P. Ex. 6 | 0 | 0 | 0 |
| P. Ex. 7 | 0 | 0 | 0 |
| P. Ex. 8 | 10 | 0 | 0 |
| P. Ex. 9 | 0 | 10 | 0 |
| P. Ex. 10 | 0 | 0 | 10 |
| PA66 | 43.9 | 43.9 | 43.9 |
| GF | 25.5 | 25.5 | 25.5 |

TABLE 3-continued

| PROPERTIES | | | |
|---|---|---|---|
| MV (Pa-sec) | 109 | 145 | 138 |
| Tens. mod. (MPa) | 9700 | 9800 | 9900 |
| Tens. str. @ break (%) | 3.3 | 3.2 | 3.1 |
| Flex. mod. (MPa) | 8000 | 8400 | 8100 |
| Flex. str. (MPa) | 211 | 221 | 210 |
| INI, 23° C. (kJ/m$^2$) | 8.7 | 8.6 | 8.3 |
| INI, −30° C. (kJ/m$^2$) | — | 8 | 4.8 |
| Vicat (° C.) | 246 | 245 | 248 |
| UL 94, 0.8 mm | V-0 | V-1 | V-0* |
| UL 94 TFT (sec) | 46 | 72 | 52 |
| CTI (V) | 541 | 500 | 450 |

*one of ten samples had an afterflame time longer than 10 seconds

Examples 9-16

Comparative Examples 6-7

These examples illustrate compositions prepared with poly(phenylene ether) masterbatches containing polyamide-6. The examples show that flame-retardant polyamide compositions can be prepared with reduced concentrations of flame retardant additive and without utilizing difficult-to-handle poly(phenylene ether) powders.

Melt volume-flow rate values, expressed in units of cubic centimeters per 10 minutes, were determined according to ISO 1133-2005 using Procedure B (displacement-measurement, automatic method), a test temperature of 300° C., an applied load of 5 kilograms, a capillary diameter of 2.0955 millimeters, a capillary length of 8.0 millimeters, a test specimen form of pellets, specimen conditioning for 5.5 hours at 120° C. before testing, and one run with five readings per composition.

Unnotched Izod impact strength values, expressed in units of kilojoules/meter$^2$, were measured as for notched Izod values at 23° C., except that specimens were not notched.

UL 94 ratings were determined at both 0.8 and 1.5 millimeter thicknesses.

The results in Table 4 show that the masterbatches with polyamide-6 and poly(phenylene ether) or poly(phenylene ether)-polysiloxane block copolymer were effective in polyamide-6,6 compositions (Examples 9-12), and polyamide-6 compositions (Examples 13-16), yielding UL 94 ratings of V-0 or V-1 with a reduced amount of flame retardant. The V-0 or V-1 ratings for the polyamide-6 compositions of Examples 13-16 were better than the V-2 ratings for corresponding Comparative Examples 6 and 7 using poly(phenylene ether) powder and poly(phenylene ether)-polysiloxane block copolymer powder, respectively. V-0 ratings at 0.8 millimeter thickness were exhibited by Examples 11 and 15 (with 20 weight percent of a poly(phenylene ether)-containing masterbatch), and Example 16 (with 20 weight percent of a poly(phenylene ether)-polysiloxane block copolymer reaction product-containing masterbatch. Mechanical properties for blends made with masterbatches are similar to those for blends made with powders, but the use of masterbatches avoided the difficulties associated with handling of poly(phenylene ether) powder.

TABLE 4

|  | C. Ex. 6 | C. Ex. 7 | Ex. 9 | Ex. 10 | Ex. 11 |
|---|---|---|---|---|---|
| COMPONENTS | | | | | |
| PPE | 10 | 0 | 0 | 0 | 0 |
| PPE-Si | 0 | 10 | 0 | 0 | 0 |
| OP1312 | 15 | 15 | 15 | 15 | 15 |
| AlSt | 0.25 | 0.25 | 0.25 | 0.25 | 0.25 |
| Stabilizer | 0.15 | 0.15 | 0.15 | 0.15 | 0.15 |
| Antioxidant | 0.2 | 0.2 | 0.2 | 0.2 | 0.2 |
| PA66 powder | 5 | 5 | 5 | 5 | 5 |
| PA66 | 0 | 0 | 43.9 | 43.9 | 33.9 |
| PA6 | 43.9 | 43.9 | 0 | 0 | 0 |
| P. Ex. 11 | 0 | 0 | 10 | 0 | 20 |
| P. Ex. 12 | 0 | 0 | 0 | 10 | 0 |
| GF | 25.5 | 25.5 | 25.5 | 25.5 | 25.5 |
| PROPERTIES | | | | | |
| MV (Pa-sec) | 193 | 143 | 150 | 141 | 158 |
| MVR (cm$^3$/10 min) | 17 | 29 | 34 | 40 | 18 |
| Tens. mod. (MPa) | 8900 | 9100 | 9400 | 9300 | 9300 |
| Tens. str. @ break (%) | 3.4 | 3.6 | 3.3 | 3.4 | 3.2 |
| Flex. mod. (MPa) | 7300 | 7400 | 8600 | 8600 | 8700 |
| Flex. str. (MPa) | 199 | 200 | 220 | 217 | 204 |
| INI, 23° C. (kJ/m$^2$) | 9.1 | 9.8 | 8.7 | 8.8 | 8.4 |
| INI, −30° C. (kJ/m$^2$) | 7.8 | 8.3 | 8.4 | 8.4 | 7.9 |
| IUI, 23° C. (kJ/m$^2$) | 58 | 60 | 51 | 54 | 42 |
| Vicat (° C.) | 212 | 211 | 246 | 245 | 236 |
| UL 94, 0.8 mm | V-2 | V-2 | V-1 | V-1 | V-0* |
| UL 94, 1.5 mm | V-1 | V-1 | V-1 | V-0 | V-0 |
| CTI (V) | 475 | 500 | 475 | 525 | 400 |

|  | Ex. 12 | Ex. 13 | Ex. 14 | Ex. 15 | Ex. 16 |
|---|---|---|---|---|---|
| COMPONENTS | | | | | |
| PPE | 0 | 0 | 0 | 0 | 0 |
| PPE-Si | 0 | 0 | 0 | 0 | 0 |
| OP1312 | 15 | 15 | 15 | 15 | 15 |
| AlSt | 0.25 | 0.25 | 0.25 | 0.25 | 0.25 |
| Stabilizer | 0.15 | 0.15 | 0.15 | 0.15 | 0.15 |
| Antioxidant | 0.2 | 0.2 | 0.2 | 0.2 | 0.2 |
| PA66 powder | 5 | 5 | 5 | 5 | 5 |
| PA66 | 33.9 | 0 | 0 | 0 | 0 |
| PA6 | 0 | 43.9 | 43.9 | 33.9 | 33.9 |
| P. Ex. 11 | 0 | 10 | 0 | 20 | 0 |
| P. Ex. 12 | 20 | 0 | 10 | 0 | 20 |
| GF | 25.5 | 25.5 | 25.5 | 25.5 | 25.5 |
| PROPERTIES | | | | | |
| MV (Pa-sec) | 156 | 239 | 217 | 251 | 243 |
| MVR (cm$^3$/10 min) | 16 | 23 | 17 | 18 | 13 |
| Tens. mod. (MPa) | 9100 | 9000 | 9000 | 8800 | 8700 |
| Tens. str. @ break (%) | 3.2 | 3.6 | 3.6 | 3.5 | 3.6 |
| Flex. mod. (MPa) | 8400 | 7400 | 7300 | 7200 | 7200 |
| Flex. str. (MPa) | 196 | 210 | 197 | 198 | 195 |
| INI, 23° C. (kJ/m$^2$) | 8.4 | 10.0 | 9.7 | 9.0 | 9.4 |
| INI, −30° C. (kJ/m$^2$) | 8.3 | 8.2 | 8.1 | 8.0 | 8.1 |
| IUI, 23° C. (kJ/m$^2$) | 36 | 63 | 59 | 57 | 58 |
| Vicat (° C.) | 232 | 212 | 210 | 211 | 207 |
| UL 94, 0.8 mm | V-1 | V-1 | V-1 | V-0* | V-0 |
| UL 94, 1.5 mm | V-0 | V-0* | V-0 | V-0 | V-0 |
| CTI (V) | 375 | 475 | 500 | 325 | 325 |

*one of ten samples had an afterflame time longer than 10 seconds

The invention claimed is:

1. A method of forming a polyamide composition, the method comprising:
melt blending components comprising, based on the weight of the polyamide composition,
5 to 30 weight percent of a poly(phenylene ether) masterbatch,
35 to 70 weight percent of a first polyamide,
15 to 40 weight percent glass fibers, and
10 to 20 weight percent of a flame retardant comprising a metal dialkylphosphinate
to form the polyamide composition;
wherein the poly(phenylene ether) masterbatch is the product of melt blending components comprising, based on the weight of the poly(phenylene ether) masterbatch,
35 to 97 weight percent poly(phenylene ether), and
3 to 65 weight percent of a second polyamide.

2. The method of claim 1, wherein the first polyamide and the second polyamide are independently selected from the group consisting of polyamide-6, polyamide-6,6, polyamide-4,6, polyamide-11, polyamide-12, polyamide-6,10, polyamide-6,12, polyamide 6/6,6, polyamide-6/6,12, polyamide MXD,6, polyamide-6,T, polyamide-6,I, polyamide-6/6,T, polyamide-6/6,I, polyamide-6,6/6,T, polyamide-6,6/6,I, polyamide-6/6,T/6,I, polyamide-6,6/6,T/6,I, polyamide-6/12/6,T, polyamide-6,6/12/6,T, polyamide-6/12/6,I, polyamide-6,6/12/6,I, and combinations thereof.

3. The method of claim 1, wherein the first polyamide and the second polyamide are independently selected from the group consisting of polyamide-6, polyamide-6,6, and combinations thereof.

4. The method of claim 1, wherein the first polyamide and the second polyamide comprise polyamide-6,6.

5. The method of claim 1, wherein the polyamide composition comprises less than or equal to 52 weight percent of the first polyamide and the second polyamide combined.

6. The composition of claim 1, wherein the poly(phenylene ether) comprises a homopolymer or copolymer of monomers selected from the group consisting of 2,6-dimethylphenol, 2,3,6-trimethylphenol, and combinations thereof.

7. The method of claim 1, wherein the poly(phenylene ether) comprises a poly(phenylene ether)-polysiloxane block copolymer.

8. The method of claim 1, wherein the polyamide composition comprises less than or equal to 19 weight percent poly(phenylene ether), based on the weight of the polyamide composition.

9. The method of claim 1, wherein the polyamide composition comprises less than or equal to 13 weight percent poly(phenylene ether), based on the weight of the polyamide composition.

10. The method of claim 1, wherein the flame retardant further comprises melamine polyphosphate.

11. The method of claim 1, wherein the flame retardant further comprises zinc borate.

12. The method of claim 1, wherein the flame retardant comprises, based on the weight of the polyamide composition, 6 to 13 weight percent of the metal dialkylphosphinate and further comprises 3 to 7 weight percent melamine polyphosphate, and 0.2 to 2 weight percent zinc borate.

13. The method of claim 1, wherein the poly(phenylene ether) masterbatch further comprises, based on the weight of the poly(phenylene ether) masterbatch, 0.2 to 5 weight percent of a compatibilizing agent for the poly(phenylene ether) and the second polyamide.

14. The method of claim 1, wherein the polyamide composition excludes electrically conductive fillers.

15. The method of claim 1, wherein the polyamide composition excludes impact modifiers.

16. A method of forming a polyamide composition, the method comprising:
melt blending components comprising, based on the weight of the polyamide composition,
5 to 14 weight percent of a poly(phenylene ether) masterbatch,
45 to 55 weight percent of a first polyamide comprising polyamide-6,6,
20 to 30 weight percent glass fibers, and 12 to 18 weight percent of a flame retardant comprising a metal dialkylphosphinate, melamine polyphosphate, and zinc borate to form the polyamide composition;

wherein the poly(phenylene ether) masterbatch is the product of melt blending components comprising, based on the weight of the poly(phenylene ether) masterbatch, 75 to 96.5 weight percent poly(phenylene ether) comprising a homopolymer or copolymer of monomers selected from the group consisting of 2,6-dimethylphenol, 2,3,6-trimethylphenol, and combinations thereof, 3 to 24.5 weight percent of a second polyamide comprising polyamide-6,6, and 0.5 to 4 weight percent of a compatibilizing agent for the poly(phenylene ether) and the second polyamide;

wherein the polyamide composition comprises less than or equal to 13 weight percent poly(phenylene ether), based on the total weight of the composition; and wherein the polyamide composition excludes electrically conductive fillers and impact modifiers.

17. The method of claim 16, wherein the poly(phenylene ether) further comprises a poly(phenylene ether)-polysiloxane block copolymer.

18. A polyamide composition prepared according to the method of claim 1.

19. A polyamide composition, comprising the product of melt blending:

40 to 60 weight percent of a polyamide;

3 to 13 weight percent of a poly(phenylene ether);

12 to 18 weight percent of a flame retardant comprising a metal dialkylphosphinate, melamine polyphosphate, and zinc borate;

0.1 to 2 weight percent of a compatibilizing agent for the polyamide and the poly(phenylene ether); and 20 to 40 weight percent glass fibers;

wherein all weight percents are based on the total weight of the polyamide composition.

20. The polyamide composition of claim 19, wherein the polyamide comprises polyamide-6,6;

wherein the polyamide composition comprises 45 to 55 weight percent of the polyamide;

wherein the poly(phenylene ether) comprises a homopolymer or copolymer of monomers selected from the group consisting of 2,6-dimethylphenol, 2,3,6-trimethylphenol, and combinations thereof;

wherein the polyamide composition comprises 6 to 12 weight percent of the poly(phenylene ether);

wherein the flame retardant comprises 6 to 13 weight percent of the metal dialkylphosphinate, 3 to 7 weight percent of the melamine polyphosphate, and 0.2 to 2 weight percent of the zinc borate; and wherein the composition comprises 20 to 30 weight percent glass fibers.

21. The polyamide composition of claim 20, wherein the poly(phenylene ether) further comprises a poly(phenylene ether)-polysiloxane block copolymer.

22. An article comprising a composition comprising the product of melt blending:

40 to 60 weight percent of a polyamide;

3 to 13 weight percent of a poly(phenylene ether);

12 to 18 weight percent of a flame retardant comprising a metal dialkylphosphinate, melamine polyphosphate, and zinc borate;

0.1 to 2 weight percent of a compatibilizing agent for the polyamide and the poly(phenylene ether); and 20 to 40 weight percent glass fibers;

wherein all weight percents are based on the total weight of the polyamide composition.

23. A method of reducing the metal dialkylphosphinate content of a flame retardant polyamide composition, comprising:

melt blending components comprising, based on the weight of the polyamide composition, 5 to 30 weight percent of a poly(phenylene ether) masterbatch, 35 to 70 weight percent of a first polyamide, 15 to 40 weight percent glass fibers, and 10 to 20 weight percent of a flame retardant comprising a metal dialkylphosphinate to form the polyamide composition;

wherein the poly(phenylene ether) masterbatch is the product of melt blending components comprising, based on the weight of the poly(phenylene ether) masterbatch, 35 to 97 weight percent poly(phenylene ether), and 3 to 65 weight percent of a second polyamide.

* * * * *